(12) United States Patent
Tonse (10) Patent No.: US 7,707,226 B1
(45) Date of Patent: Apr. 27, 2010

(54) PRESENTATION OF CONTENT ITEMS BASED ON DYNAMIC MONITORING OF REAL-TIME CONTEXT

(75) Inventor: Sudhir Tonse, Fremont, CA (US)

(73) Assignee: AOL Inc., Dulles, VA (US)

( * ) Notice: Subject to any disclaimer, the term of this patent is extended or adjusted under 35 U.S.C. 154(b) by 271 days.

(21) Appl. No.: 11/668,261

(22) Filed: Jan. 29, 2007

(51) Int. Cl.
*G06F 17/30* (2006.01)

(52) U.S. Cl. .................... 707/796; 707/922; 707/999.1; 707/999.107

(58) Field of Classification Search .................... 707/1, 707/2, 3, 100, 104.1; 709/206, 224, 240
See application file for complete search history.

(56) References Cited

U.S. PATENT DOCUMENTS

| | | | |
|---|---|---|---|
| 5,717,923 A | 2/1998 | Dedrick | |
| 5,796,952 A | 8/1998 | Davis et al. | |
| 5,918,014 A | 6/1999 | Robinson | |
| 5,948,061 A | 9/1999 | Merriman et al. | |
| 6,014,638 A | 1/2000 | Burge et al. | |
| 6,047,310 A | 4/2000 | Kamakura et al. | |
| 6,108,637 A | 8/2000 | Blumenau | |
| 6,144,944 A | 11/2000 | Kurtzman, II et al. | |
| 6,285,987 B1 | 9/2001 | Roth et al. | |
| 6,334,110 B1 | 12/2001 | Walter et al. | |
| 6,421,706 B1* | 7/2002 | McNeill et al. | 709/204 |
| 6,516,312 B1 | 2/2003 | Kraft et al. | |
| 6,959,339 B1 | 10/2005 | Wu et al. | |
| 7,035,923 B1* | 4/2006 | Yoakum et al. | 709/224 |
| 7,039,599 B2 | 5/2006 | Merriman et al. | |
| 7,072,984 B1* | 7/2006 | Polonsky et al. | 709/246 |
| 7,155,508 B2* | 12/2006 | Sankuratripati et al. | 709/224 |
| 7,200,590 B2* | 4/2007 | Everett-Church et al. | 707/3 |
| 7,353,267 B1* | 4/2008 | Cunningham et al. | 709/224 |
| 2001/0036182 A1 | 11/2001 | Addante | |
| 2001/0054001 A1 | 12/2001 | Robinson | |
| 2002/0004733 A1 | 1/2002 | Addante | |
| 2002/0046099 A1 | 4/2002 | Frengut et al. | |
| 2002/0072984 A1 | 6/2002 | Rothman et al. | |
| 2002/0099600 A1 | 7/2002 | Merriman et al. | |
| 2003/0009385 A1 | 1/2003 | Tucciarone et al. | |
| 2003/0115187 A1 | 6/2003 | Bode et al. | |
| 2004/0123247 A1 | 6/2004 | Wachen et al. | |
| 2004/0186766 A1* | 9/2004 | Fellenstein et al. | 705/14 |

(Continued)

OTHER PUBLICATIONS

"Search advertising glossary of terms," Author Unknown, Aug. 6, 2004, [online] [retrieved on Oct. 12, 2006], 6 pgs. Retrieved from the Internet: http://web.archive.org/web/200408060065852/http://www.google.com/ads/glossary.html.

(Continued)

*Primary Examiner*—Tim T. Vo
*Assistant Examiner*—Dangelino N Gortayo
(74) *Attorney, Agent, or Firm*—Workman Nydegger (57) ABSTRACT

The present invention provides systems and methods for providing real-time context-based content items to a user client system. Methods include dynamically monitoring a user client system to determine a real-time context of the user client system based on one or more of identifying one or more content keywords of an application operating on the user client system and/or one or more system capabilities of the user client system. One or more content items can be presented and changed based on changes detected in the real-time context of the user client system.

16 Claims, 6 Drawing Sheets

U.S. PATENT DOCUMENTS

| | | | |
|---|---|---|---|
| 2005/0091106 | A1 | 4/2005 | Reller et al. |
| 2005/0149395 | A1 | 7/2005 | Henkin et al. |
| 2005/0154718 | A1 | 7/2005 | Payne et al. |
| 2005/0187950 | A1 | 8/2005 | Parker et al. |
| 2005/0223000 | A1 | 10/2005 | Davis et al. |
| 2005/0240580 | A1 | 10/2005 | Zamir et al. |
| 2006/0026147 | A1 | 2/2006 | Cone et al. |
| 2006/0080321 | A1 | 4/2006 | Horn et al. |
| 2006/0136294 | A1 | 6/2006 | Linden et al. |
| 2006/0242139 | A1 | 10/2006 | Butterfield et al. |
| 2006/0242178 | A1 | 10/2006 | Butterfield et al. |
| 2007/0083639 | A1 | 4/2007 | Gilbert et al. |
| 2007/0150347 | A1* | 6/2007 | Bhamidipati et al. .......... 705/14 |
| 2007/0208751 | A1* | 9/2007 | Cowan et al. ................. 707/10 |
| 2007/0271340 | A1* | 11/2007 | Goodman et al. ........... 709/206 |
| 2008/0109406 | A1* | 5/2008 | Krishnasamy et al. ......... 707/3 |

OTHER PUBLICATIONS

"Ask Jeeves' Sponsored Listings Portends Fragmentation of Search Marketing," by Charlene Li, Aug. 2, 2005, [online][retrieved on Oct. 18, 2006], 4 pgs. Retrieved from the Internet: http://blogs.forrester.com/charleneli/2005/08/ask_jeeves_spon.html.

"Advertise your business on Google," Author Unknown, Date Unknown, [online] [retrieved on Oct. 18, 2006], 4 pgs. Retrieved from the Internet: https://adwords.google.com/select/Login.

"Keyword Tool," Author Unknown, Date Unknown3 [online] [retrieved on Oct. 24, 2006], 1 pg. Retrieved from the Internet: https://adwords.google.com/select/KeywordToolExternal?defaultView=2.

"Unintrusive Customization Techniques for Web Advertising," by Marc Langheinrich, Atsuyoshi Nakamura, Naoki Abe, Tomonari Kamba, Yoshiyuki Koseki, Amsterdam, Netherlands, 1999, [online] [retrieved on Oct. 12, 2006]. 19 pgs. Retrieved from the Internet: http://www.vs.inf.ethz.ch/publ/papers/www8-adwiz/.

Bibliography for "Unintrusive Customization Techniques for Web Advertising," by Marc Langheinrich, Atsuyoshi Nakamura, Naoki Abe, Tomonari Kamba, Yoshiyuki Koseki, as found on http://citeseer.ist.psu.edu/366379.html [online] [retrieved on Oct. 12, 2006], 2 pgs.

"Optimizing Search by Showing Results in Context," by Susan Dumais, Edward Cutrell, and Hao Chen, ©2001, published in *SIGCHI'01*, Mar. 31-Apr. 4, 2001, 8 pgs.

Bibliography for "Optimizing Search by Showing Results in Context," by Susan Dumais, Edward Cutrell, and Hao Chen, © 2001, as found on http://citeseer.ist.psu.edu/dumais01optimizing.html [online] [retrieved on Dec. 6, 2006], 1 pg.

"Should Yahoo Own Social Search and Rank in a Web 2.0 World?," by Thomas Hawk, Oct. 30, 2006, [online] [retrieved on Nov. 1, 2006], 2 pgs. Retrieved from the Internet: http://www.searchnewz.com/blog/talk/sn-6-20061030ShouldYahooOwnSocialSearchandRankinaWeb20World.html.

"Top 10 Search Results Guarantee," Author Unknown, Date Unknown, [online] [retrieved on Oct. 11, 2006], 2 pgs. Retrieved from the Internet; http://www.networksolutions.com/web-site-promotion/popup-search-engine-optimization-guarantee.jsp.

"Designing Web Ads Using Click-Through Data," by Jakob Nielsen, Sep. 2, 2001, [online] [retrieved on Oct. 12, 2006], 3 pgs. Retrieved from the Internet: http://www.useit.com/alertbox/20010902.html.

"The Science of Targeting," by Dawn Anfuso, Mar. 18, 2004, [online] [retrieved on Oct. 12, 2006], 3 pgs. Retrieved from the Internet: http://www.imediaconnection.com/global/5728.asp?ref=http://www.imediaconnection.com/content/3045.asp.

"Study Shows Target Demographics Important in Search Engine Marketing Campaigns," Author Unknown, May 18, 2004, [online] [retrieved on Oct. 12, 2006], 3 pgs. Retrieved from the Internet: http://www.searchenginejournal.com/?p=582.

"Optimizing Paid Search Advertising," by Kevin Gold, Nov. 9, 2004, [online] [retrieved on Oct. 12, 2006], 2 pgs. Retrieved from the Internet: http://content.websitegear.com/article/print.asp?id=ppc_effectiveness.

"MSN adCenter Joins Yahoo and Google in Search Advertising," by Greg Sterling, Mar. 17, 2005, [online] [retrieved on Oct. 12, 2006], 3 pgs. Retrieved from the Internet: http://www.searchenginejournal.com/?p=1438.

"The Decade in Online Advertising 1994-2004," by Rick E. Bruner, Apr. 2005, DoubleClick, Inc., 11 pgs. [www.doubleclick.com].

"Target Demographics, Before and After," by Rick E. Bruner and Kathryn Koegel, Jun. 2005, DoubleClick, Inc., 9 pgs. [www.doubleclick.com].

"Search Engine Strategies 2005 Conference & Expo Agenda Monday, Dec. 5, 2005," Author Unknown, Oct. 28, 2005, [online] [retrieved on Dec. 6, 2006]. 5 pgs. Retrieved from the Internet: http://web.archive.org/web/20051028030050/www.jupiterevents.com/sew/fall05/agenda1.html.

"Search Engine Strategies 2005 Conference & Expo Agenda Tuesday, Dec. 6, 2005," Author Unknown, Oct. 28, 2005, [online] [retrieved on Dec. 6, 2006], 4 pgs. Retrieved from the Internet: http://web.archive.org/web/20051028030050/www.jupiterevents.com/sew/fall05/agenda2.html.

"Search Engine Strategies 2005 Conference & Expo Agenda Wednesday, Dec. 7, 2005," Author Unknown, Oct. 28, 2005, [online] [retrieved on Dec. 6, 2006], 4 pgs. Retrieved from the Internet: http://web.archive.org/web/20051028030050/www.jupiterevents.com/sew/fall05/agenda3.html.

"Search Engine Strategies 2005 Conference & Expo Agenda Thursday, Dec. 8, 2005," Author Unknown, Oct. 28, 2005, [online] [retrieved on Dec. 6, 2006], 4 pgs. Retrieved from the Internet: http://web.archive.org/web/20051028030050/www.jupiterevents.com/sew/fall05/agenda4.html.

"Targeting Search Ads by Demographics & Behavior," Author Unknown, Feb. 27, 2006, [online] [retrieved on Nov. 28, 2006], 5 pgs. Retrieved from the Internet: http://www.seroundtable.com/archives/003379.html.

"Targeting Search Ads by Demographics & Behavior," by Greg Jarboe, Mar. 22, 2006, [online] [retrieved on Oct. 12, 2006], 3 pgs. Retrieved from the Internet: http://searchenginewatch.com/showPage.html?page=sew_print&id=3593236.

"Best Practices for Optimizing Web Advertising Effectiveness," by Rick E. Bruner, May 2006, DoubleClick, Inc., 14 pgs. [www.doubleclick.com]

"The Promise of Behavioral Targeting," by Bruce Clay, Aug. 24, 2006, [online] [retrieved on Oct. 12, 2006], 3 pgs. Retrieved from the Internet: http://www.searchengineguide.com/cgi-bin/mtview.cgi/75/entry/8277/print_version.

"Microsoft® adCenter Labs Presentation," Author Unknown, Jun. 11, 2006, [online] [retrieved on Dec. 6, 2006], 2 pgs. Retrieved from the Internet: http://web.archive.org/web/20060601184523/http://adlab.msn.com/demo.aspx.

"The Web Bug FAQ," by Richard M. Smith, Nov. 11, 1999 [online] [retrieved on Oct. 18, 2006], 4 pgs. Retrieved from the Internet: http://www.eff.org/Privacy/Marketing/web_bug.html.

"Software to Track E-Mail Raises Privacy Concerns," by Amy Harmon, Nov. 22, 2000 [online] [retrieved on Oct. 18, 2006], 9 pgs. Retrieved from the Internet: http://www.nytimes.com/2000/11/22/technology/22NET.html?ex=1165467600&en=fd45f4346250d53f&ei=5070, http://www.nytimes.com/2000/11/22/technology/22NET.html?pagewanted=2&ei=5070&en=fd45f4346250d53f&ex=1165467600, and http://www.nytimes.com/2000/11/22/technology/22NET.html?pagewanted=3&ei=5070&en=fd45f4346250d53f&ex=1165467600.

"Technology Talk—Capturing Implied Response, a.k.a. Link Tracking," Author Unknown, May 2001 [online] [retrieved on Oct. 18, 2006], 2 pgs. Retrieved from the Internet: http://web.archive.org/web/20010702062409/http://www.netline.com/newsletter/h/techtalk05_01.html.

"The Hunt for Stats Tracking Email and Clear Pixels," by Keith Boswell, The Marketleap Report vol. II, Issue #14—Part 2, Aug. 21, 2002 [online] [retrieved on Nov. 27, 2006], 4 pgs. Retrieved from the Internet: http://www.marketleap.com/report/ml_report_34.htm.

"More on Email Privacy," by Preston Gralla, Jun. 8, 2004 [online] [retrieved on Oct. 18, 2006], 3 pgs. Retrieved from the Internet: http://www.oreillynet.com/windows/blog/2004/06/more_on_email_privacy.html.

"Web Buggery: Analyzing Tracking Images," Author Unknown, Dec. 7, 2004 [online] [retrieved on Dec. 6, 2006], 7 pgs. Retrieved from the Internet: http://web.archive.org/web/20041207215656/irongeek.com/i.php?page=security/webbugs.

*Internet Archive, Frequently Asked Questions*; http://www.archive.org/about/faqs.php; Dec. 6, 2006; 46 pages.

*About Citeseer*; http://citeseer.ist.psu.edu/citeseer.html; Dec. 6, 2006; 2 pages.

"Powerseek PPC Plug-In Manual," Author Unknown, Nov. 19, 2004 [online] [retrieved on Dec. 6, 2006], 4 pgs. Retrieved from the Internet: http://web.archive.org/web/20041119021954/http://www.focalmedia.net/ppc_manual/4_ppc.html.

Microsoft to Announce AdWords Competitor, by Chris Richardson, Mar. 15, 2005, [online] [retrieved on Oct. 18, 2006], 4 pgs. Retrieved from the Internet: http://www.webpronews.com/printable.php.

New Ask Jeeves Sponsored Listings Program Lets More Advertisers Buy Direct, by Danny Sullivan, Aug. 1, 2005, [online] [retrieved on Oct. 18, 2006], 3 pgs. Retrieved from the Internet: http://searchenginewatch.com/showPage.html?page=sew_print&id=3524141.

Allfeeds Google Backfill, Author Unknown, Aug. 24, 2005 [online] [retrieved on Oct. 18, 2006], 2 pg Retrieved from the Internet: http://www.theadminzone.com/forums/printthread.php?t=13512.

A Nifty Personalized News Site, by JD Lasica, Jan. 14, 2004, [online] [retrieved on Nov. 27, 2006], 10 pgs. Retrieved from the Internet: http://www.newmediamusings.com/blog/2004/01/a_nifty_persona.html.

Home page for Findory.com, Nov. 2, 2004 [online] [retrieved on Dec. 6, 2006], 2 pgs. Retrieved from the Internet: http://web.archive.org/web/20041102024941/http://findory.com/.

"About Findory", Nov. 2, 2004[online] [retrieved on Dec. 6, 2006], 1 pg. Retrieved from the Internet:http://web.archive.org/web/20041125040039/findory.com/company/.

Multi-Service Search and Comparison Using the MetaCrawler, by Erik Selberg and Oren Etzioni, © 1993, 1994 Nikos Drakos, Computer Based Learning Unit, University of Leeds, translation initiated by Erik Selberg on Oct. 9, 1995, [online] [retrieved on Oct. 12, 2006], 16 pgs. Retrieved from the Internet.

Bibliography for "Multi-Service Search and Comparison Using the MetaCrawler," by Erik Selberg and Oren Etzioni, © 1993, 1994, Nikos Drakos, Computer Based Learning Unit, University of Leeds, as found on http://citeseer.ist.psu.edu/selberg95multiservice.html [online] [retrieved on Dec. 6, 2006], 2 pgs.

New Site Layout Influences Results for Bankrate.com, by Mickey Alam Khan, Jul. 12, 2004, [online] [retrieved on Nov. 27, 2006], 2 pgs. Retrieved from the Internet: http://www.optimost.com/press/071204.phtml.

Windows 2000 server as a router, Speciality Forums on Computing.net, question on how to set up a Windows 2000 Server as a router submitted Jul. 8, 2002 with instructions to do so in responses submitted Jul. 9, 2002. Retreived from http://www.computing.net answers/networking/windows-2000-server-as-a router/7827.html.

* cited by examiner

PRESENTATION OF CONTENT ITEMS BASED ON DYNAMIC MONITORING OF REAL-TIME CONTEXT

CROSS-REFERENCE TO RELATED APPLICATIONS

Not applicable.

BACKGROUND OF THE INVENTION

1. The Field of the Invention

The present invention is related to selecting and/or presenting content items based on the real-time context of a user client system. More particularly, methods and systems are provided for selecting certain aspects of the real-time context of a user client system on which to base selecting and/or presenting of content items.

2. The Relevant Technology

Currently, advertisements are selected and delivered to a client system based on the static state condition of the client system. Advertisement providers do not take into account a user's context. Furthermore, current advertising systems do not take into account any external factors outside of the existing page in which the advertisements are displayed. For example, in an instant messaging system, all of the participants in the instant messaging session are presented with the same advertisements. It would be advantageous to be able to present a user with content items that are personalized and tailored to the particular real-time context of that user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The present invention is directed to systems and method for providing real-time context-based content items to a user client system. One embodiment of the invention includes a method including dynamically monitoring a user client system to determine a real-time context of the user client system. The real-time context of the user client system can be evaluated based on one or more factors. In one embodiment, the real-time context is based on identifying one or more content keywords of an application operating on the user client system, one or more past search keywords of the user client system, one or more user demographic profile keywords of the user client system, and/or one or more system capabilities of the user client system. The method further includes identifying a first content item based on the real-time context of the user client system, sending the first content item to the user client system, further performing dynamic monitoring of the real-time context of the user client system, identifying a second content item based on a change in the real-time context of the user client system, and sending the second content item to the user client system.

Another embodiment of the invention includes a method including dynamically monitoring a user client system to determine a real-time context of the user client system including determining two or more system capabilities of the user client system, identifying a first content item capable of being presented by the two or more system capabilities of the user client system, presenting the first content item on the user client system using a first system capability of the user client system, further performing dynamic monitoring of the real-time context of the user client system to detect a change in the real-time context of the user client system, and presenting the first content item on the user client system using a second system capability of the user client system.

Yet another embodiment of the invention includes a method for providing real-time context-based content items to the instant messaging client including identifying an instant messaging session between a first instant messaging client and a second instant messaging client, dynamically monitoring the instant messaging session to determine a real-time context of the first instant messaging client including identifying one or more content keywords of the instant messaging session, identifying a first content item based on the real-time context of the first instant messaging client, sending the first content item to the first instant messaging client, further performing dynamic monitoring of the real-time context of the first instant messaging client, identifying a second content item based on a change in the real-time context of the first instant messaging client, and sending the second content item to the first instant messaging client.

This summary is provided to introduce a selection of concepts in a simplified form that are further described below in the Detailed Description. This summary is not intended to identify key features or essential characteristics of the claimed subject matter, nor is it intended to be used as an aid in determining the scope of the claimed subject matter.

These and other features of the present invention will be set forth in the description which follows, and in part will become more fully apparent from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
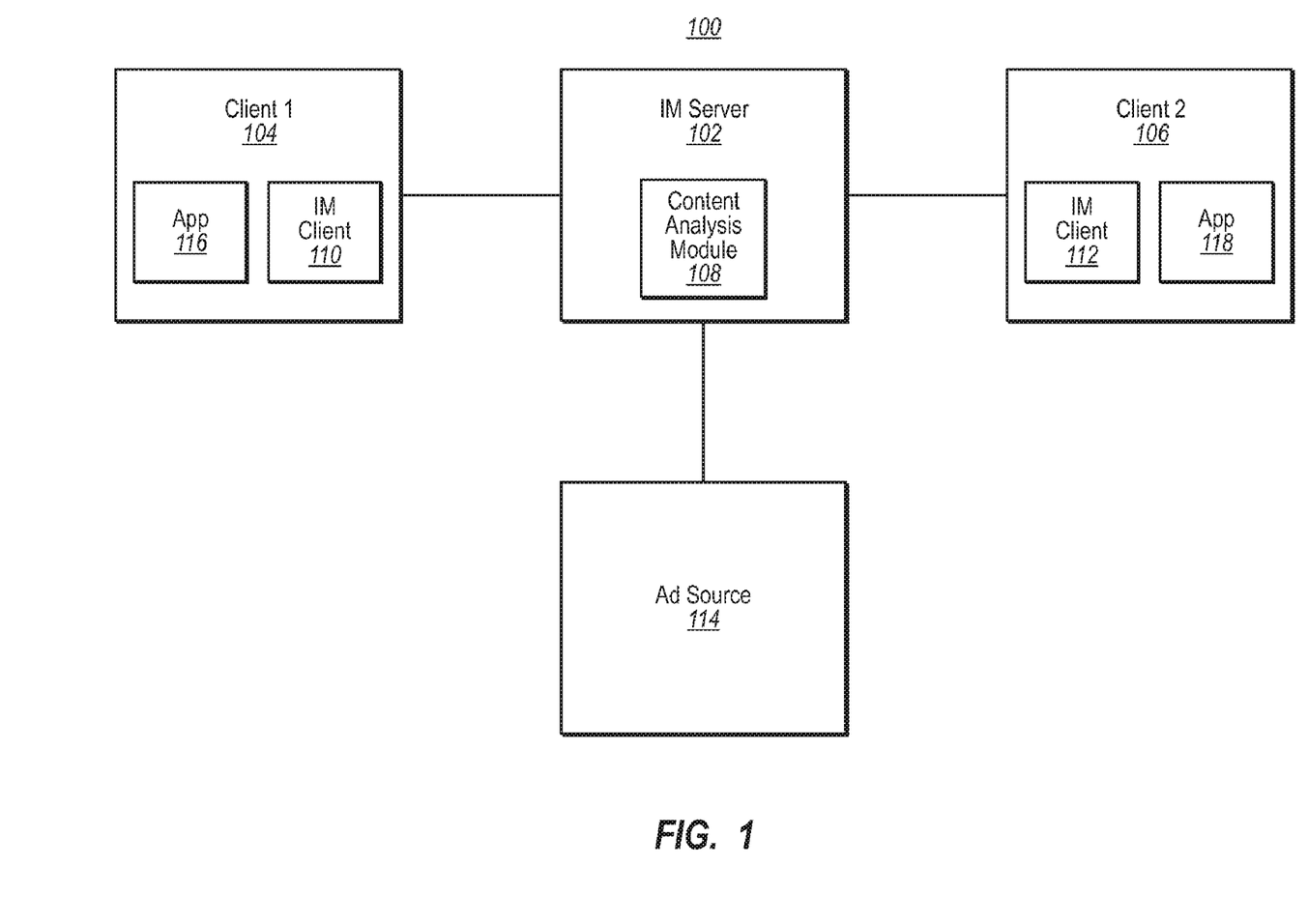
FIG. 1 illustrates an exemplary network environment for implementing methods of the present invention.

Embodiments of the present invention provide for methods and systems for dynamically monitoring the real-time context of one or more user client systems and determining advertising to be presented on the user client system based on this real-time context and changes in the real-time context. As illustrated in FIG. 1, an exemplary network system 100 is depicted in which a server 102 is communicatively coupled with one or more user client systems 104 and 106. The server 102 includes a context monitoring module 108 for monitoring the real-time context of each of the user client systems 104, 106. In one embodiment, the user client systems 104, 106 may be communicating with each other in a collaborative messaging environment such as instant messaging. In this scenario, server 102 may perform the role of an instant messaging server and each of the user client systems 104, 106 have an instant messaging client application 110, 112 which enables them to communicate with the server 102, and, hence, each other.

The server 102 monitors the real-time context of a user client system 104. Upon determining a state of the real-time context of a user client system 104, the server 102 obtains one or more content items from a content item source 114 based on the current state of the real-time context. If the server 102 detects a change in the real-time context of the user client system 104, server 102 can either select a different content item from content item source 114 or server 102 can change how the first content item is presented on user client system 104. It will be appreciated that server 102, user client systems 104, and/or content item source 114 may communicate via direct link or via a network, such as the Internet.

While some embodiments of the present invention will be described using an advertisement as an example of a content item, it will be appreciated that a content item is broadly construed to include, but is not limited to, informational content including, but not limited to, information from broad-based websites (e.g., Yahoo, MSN, AOL), news websites (e.g., CNN, New York Times), information from single-topic websites (e.g., blogs), promotional material (e.g., from Google, Ingenio, Overture, ad.com), and the like. Thus, content items include any articles, feeds, advertisements, sponsored links, pay per call advertisements, banner advertisements, popup content, music links, audio clips, news headlines, video clips, images, photographs, and the like, in any format including text, graphics, audio, visual, rich media, and the like. The content item can include links (whether visible or not) that, when selected, redirect a user to another content item, such as a web page, a sponsored link, a video clip, an audio stream clip, a popup advertisement, and the like.

User client systems 104, 106 can further include one or more applications 116, 118 operating thereon, respectively. It will be appreciated that applications 116, 118 may be operated locally from user client systems 104, 106, or may be located on server 102 and accessed remotely. Network communicating systems, such as web applications, instant messaging systems, and email systems, are well known in the art, thus, system 100 will not be discussed in further detail.

Figure 2:
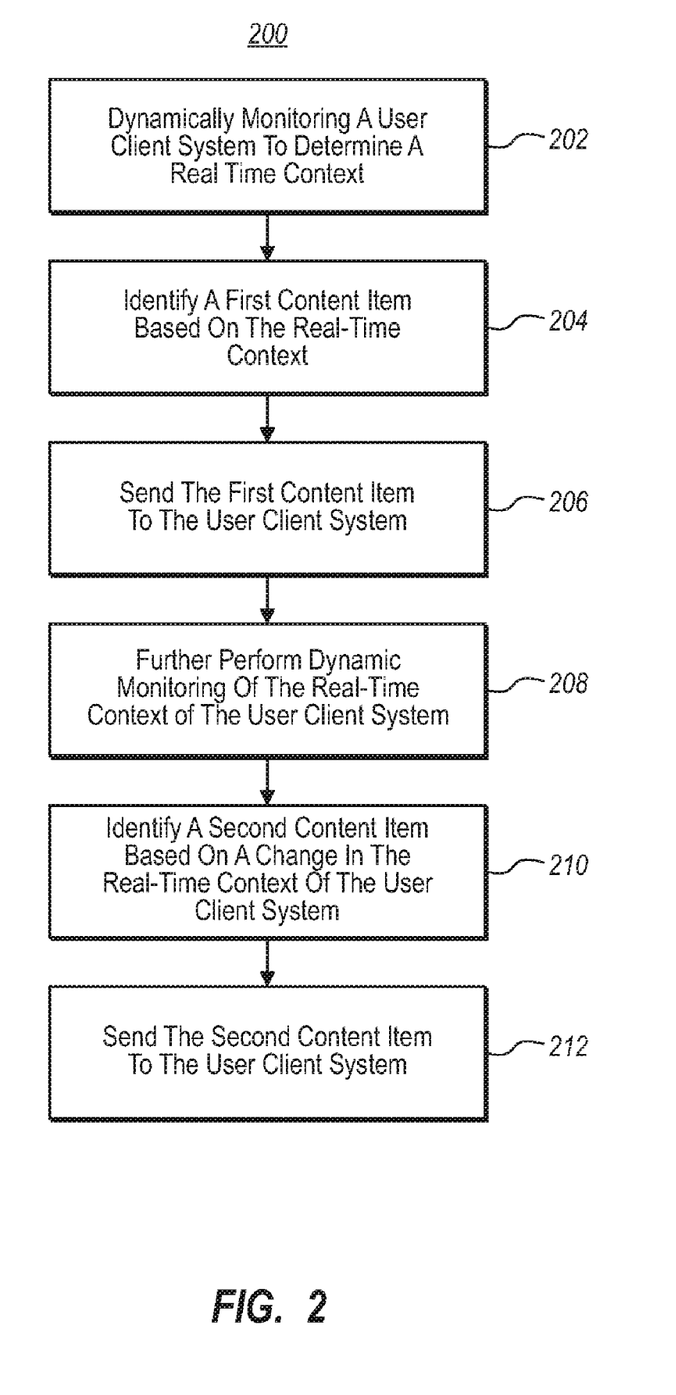
FIG. 2 illustrates an exemplary method of one embodiment of the present invention.

Turning to FIG. 2, one aspect of the present invention is directed to a method 200 for providing real-time context-based content items to a user client system. The method may be practiced, for example, at server 102 illustrated in FIG. 1. The server 102 may include one or more computer-readable media having computer-executable instructions, that when executed, implement the method 200.

Method 200 includes, as 202, dynamically monitoring a user client system 104 to determine a real-time context of the user client system. In one embodiment, context monitoring module 108 of server 102 can perform this dynamic monitoring. The real-time context of the user client system can be evaluated based on one or more factors. In one embodiment, the real-time context is based on identifying one or more content keywords of an application 116 operating on the user client system. Identifying one or more content keywords can include, but is not limited to, crawling content presented by the application 116, detecting metadata associated with the application 116, identifying content of interest of the application 116 based on user interaction with at least an aspect of the application, identifying a lack of user interaction with at least an aspect of the application 116, and the like. Identifying content of interest of the application 116 based on user interaction with at least an aspect of the application 116 can further include detecting such events including, but not limited to, hovering over an aspect of a display of the application 116, clicking on a link in the content of the application 116, identifying a conversion related to content of the application 116, identifying content input by the user into the application 116, and the like.

Real-time context can also be based on identifying one or more past search keywords of the user client system 104 including exposing one or more application programming interfaces to obtain one or more previous searches performed by the user.

Real-time context can further be based on identifying one or more user demographic profile keywords of the user client system 104 including, but not limited to, a geographic location of the user client system, a time at which the dynamic monitoring of the user client system is occurring, a date on which the dynamic monitoring of the user client system is occurring, an age of a user, a gender of a user, and the like.

Further, real-time context can be based on determining one or more system capabilities of the user client system 104. In one embodiment, this can include sending an operating system call to the user client system 104 to receiving information about the system capabilities of the user client system. System capabilities include, but are not limited to, identifying one or more applications operating on the user client system (such as an embedded HTML application), an operating system of the user client system, video capabilities of the user client system, audio capabilities of the user client system, available processing power of the user client system, available memory of the user client system, properties of one or more applications 116, and the like.

At 204, the server 102 identifies a first content item based on the real-time context of the user client system. This can include server 102 accessing content item source 114 to obtain the first content item. At 206, the server 102 sends the first content item to the user client system 104. The first content item is thus rendered on the user client system 104.

At 208, the server 102 further performs dynamic monitoring of the real-time context of the user client system 104. This can include monitoring any one or more of the factors identified above that contribute to the real-time context of the user client system 104.

At 210, the server 102 identifies a second content item based on a change in the real-time context of the user client system. This can include server 102 sending a second request to content item source 114 for a second content item. Alternatively, at 204, when the server 102 first requests the first content item, the server 102 may receive multiple content items such that at 210, the server 102 is able to select from among a group of available content items. At 212, the server 102 sends the second content item to the user client system 104.

Thus, the present invention provides for dynamically monitoring the context of a user client system, which context can be continually changing. For example, the user may be operating a web application from user client system, which initially displays a first advertisement. As the user continues to operate the web application, the server 102 monitors the user's interaction with the web application. As the user performs searches, clicks on links, inputs information, etc., the context of the web application may be continually changing (e.g., using Ajax code). However, the present invention is able to analyze changes in the real-time context, which in one embodiment, triggers a change in the content item being displayed on the web application in order to attempt to display a content item that interests a user. In other words, the content items displayed on the web application change according to the content that the user displays the most interest in.

As the real-time context of the user is being dynamically identified, content items relevant to the current context of the user are dynamically presented to the user, such as advertisements. The content item that are dynamically presented are preferably selected based on the factor that caused the change in real-time context of the user client system so as to be more relevant to the user. Any and all of the above real-time context factors can be used to contribute to a real-time understanding of the current context of a user and initiate and account for dynamic changes of content items based on the same. Thus, the present invention provides for performing real-time analysis of the user context to determine which content items to present to the user, which content items can be dynamically changing as the user context changes.

Figure 3:
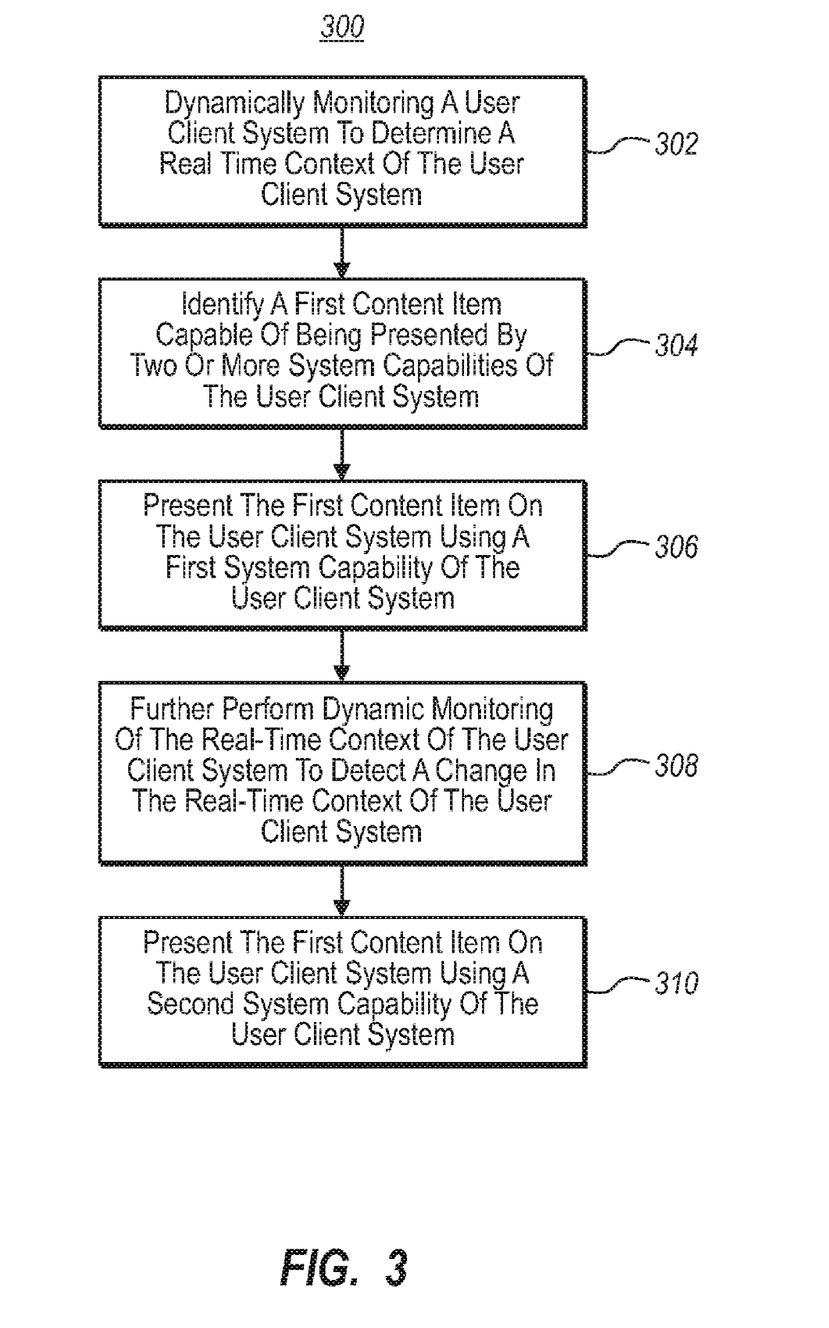
FIG. 3 illustrates an exemplary method of another embodiment of the present invention.

Turning to FIG. 3, another aspect of the invention is described with regard to an exemplary method 300. The method may be practiced, for example, at server 102 illustrated in FIG. 1. The server 102 may include one or more computer-readable media having computer-executable instructions, that when executed, implement the method 300.

Method 300 includes, at 302, dynamically monitoring a user client system to determine a real-time context of the user client system. In one embodiment, context monitoring module 108 at server 102 can perform this dynamic monitoring. Generally, this can include identifying any of the factors described above for 202. In particular, method 300 includes determining two or more system capabilities of the user client system 104. At 304, server 102 identifies a first content item capable of being presented by the two or more system capabilities of the user client system 104. In one embodiment, the first system capability is selected for presenting the first content item on the user client system due to the undesirability of the second system capability.

At 306, server 102 presents the first content item on the user client system 104 using a first system capability of the user client system. At 308, server 102 further performs dynamic monitoring of the real-time context of the user client system 104 to detect a change in the real-time context of the user client system. Upon detecting a change in the real-time context of the user client system 104, at 310, server 102 presents the first content item on the user client system using a second system capability of the user client system.

Thus, one embodiment of the invention contemplates identifying two or more system capabilities and displaying content items based on the state of the two or more system capabilities. This broadly encompasses many scenarios, but a few examples will be described. In one example, two or more applications are running on a user client system. Server 102 determines the capabilities of the applications, for example, whether the applications are web applications, audio applications, or video applications. Based on this determination, a content item is selected that can be presented to the user via one or more of these applications. For example, if one of the applications is an audio application, the server 102 would select a content item that can be played audibly, preferably automatically playing the audio content item. However, the server 102 may prefer to display the content item via the second application if, for example, content is currently being played on the audio application so as not to cause audio confusion for the user. In this situation, the audio application would be less preferred as a vehicle for presenting the first content item. The presentation of the first content item can subsequently change based on the state of the two applications. For example, if the first content item is played via the audio application, but the user changes to play a song on the audio application, the server 102 can identify the change of the user of the audio application and also the current audio being played as part of the real-time context of the user client system. Server 102 may select a second content item, for example, a banner advertisement to display on a second application relating to the artist that is being played on the audio application.

Another example includes selecting a content item that can be presented in multiple configurations (i.e., banner, sponsored link, audio and video), and selecting which of the configurations to use to present to the user based on the state of the user's computer. For example, if the user has multiple instant messaging windows and an audio application operating, information about these multiple applications is sent to server 102 to select potential content items and also to decide how best to present the content item to the user. For example, if audio is being used, server 102 may send back a banner add to catch user's attention. Alternatively, if audio is not being used, server 102 may cause the content item to automatically play an audio the audio application running on the user client system. In this case, the server 102 selects only one content item, but the same content item is presentable in various ways.

Figure 4:
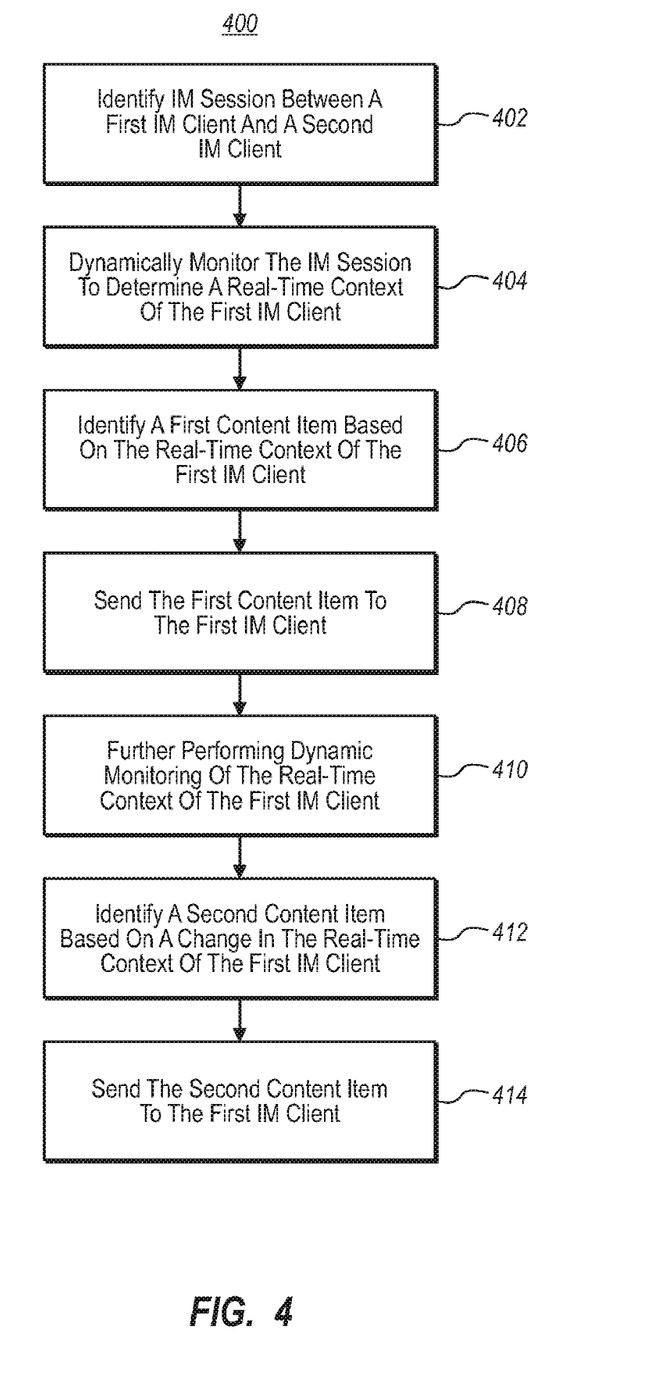
FIG. 4 illustrates an exemplary method of yet another embodiment of the present invention.

One embodiment of the invention provides real-time context-based content items while the user is participating in an instant messaging environment. FIG. 4 depicts this method 400 in further detail. The content of the instant messaging session is dynamically monitored to determine what the user is most interested in and content items are dynamically displayed accordingly. As the user changes topics in the instant messaging session, the presentation of the content items takes into account the change in topic. Further, the presentation of content items can also take into account a user's past searches or demographics to present additional options for displaying content items to the user. The method may be practiced, for example, at server 102 illustrated in FIG. 1. The server 102 may include one or more computer-readable media having computer-executable instructions, that when executed, implement the method 400.

At 402, server 102 identifies an instant messaging session between a first instant messaging user client system 104 and a second instant messaging user client system 106. As discussed above, server 102 can be an instant messaging server that initiates and maintains an instant messaging session between user client system 104 and user client system 106.

At 404, server 102 dynamically monitors the instant messaging session to determine a real-time context of the first instant messaging user client system 104. For example, suppose users "Joe" and "Jane" are using instant messaging client applications 110 and 112, respectively, to conduct an instant messaging conversation. At time X, server 102 extracts the following information for Joe, which can be obtained, for example, from databases or using API calls:
  Location: Mountain View, Calif.
  Age: 32
  Gender: Male
  Last 5 Searches: "java algorithms", "top 10 box office movies", "used golf clubs", "oscar nominations", "weather in Mountain View"

In addition to the above information, the instant messaging client 110 installed on Joe's user client system 104 can provide the following information, using, for example, operating system calls:
  Operation System: Window XP
  Video Capabilities: QuickTime, Windows Media Player
  Audio Engaged ?: Yes
  CPU: 35%
  Mem Free: 256M Similarly, at time X, the following real-time context data is collected for Jane:
  Location: Sunnyvale, Calif.
  Age: 28
  Gender: Female
  Last 5 Searches: "diet programs", "romantic movies", "after-christmas sales", "real estate in bay area", "baby sitter sunnyvale"

In addition to the above information, the instant messaging client application 112 installed on Jane's user client system 106 can provide the following information:
  Operation System: Window 2000
  Video Capabilities: QuickTime
  Audio Engaged ?: No
  CPU: 45%
  Mem Free: 128M In addition, monitoring the real-time context of the instant messaging session can include identifying one or more content keywords of the instant messaging session. For example, either the instant messaging server 102 or either instant messaging client application 110 or 112 on user client system 104 or 106 can provide the content of the instant messaging session. For example, assume that the following conversation has taken place at time X:
  Joe: Hey, How are you?
  Jane: Good-do you want to catch a Movie?
  Joe: Sure-but where wud u like to go?
  Jane: How about Century 25 on 880?
  Joe: Cool-what movie do you want to see?

While the above conversation is taking place, context monitoring module 108 at server 102 analyzes the instant messaging conversation to obtain one or more content keywords, such as "weekend" and "movie." Context monitoring module 108 can continue to monitor portions of instant messaging sessions that occur between particular time intervals. At 406, server 102 identifies a first content item for each of the real-time contexts of the first instant messaging user client system 104 and second instant messaging user client system 106. Note that the content item can be different for each user client system 104, 106.

Figure 5A:
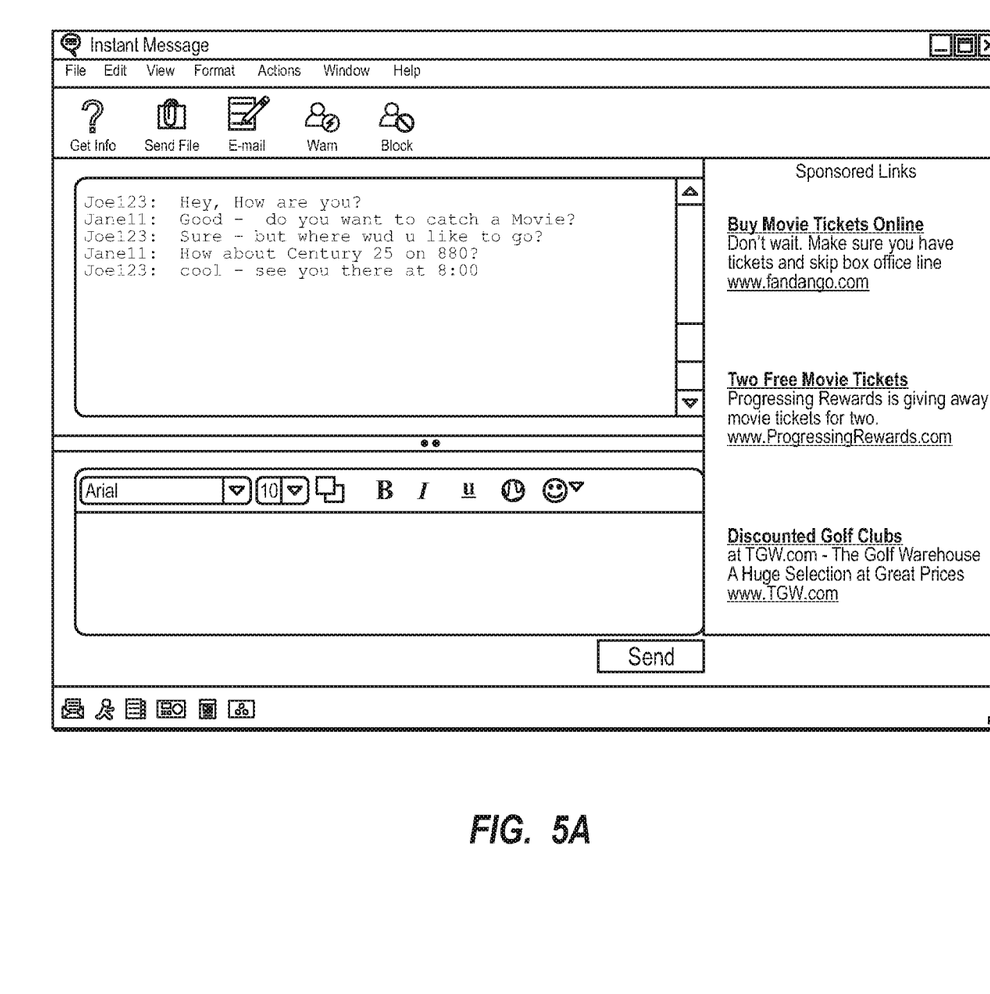
FIG. 5A illustrates an exemplary instant messaging user interface presenting various content items related to the context of a first participant in an instant messaging conversation.
Figure 5B:
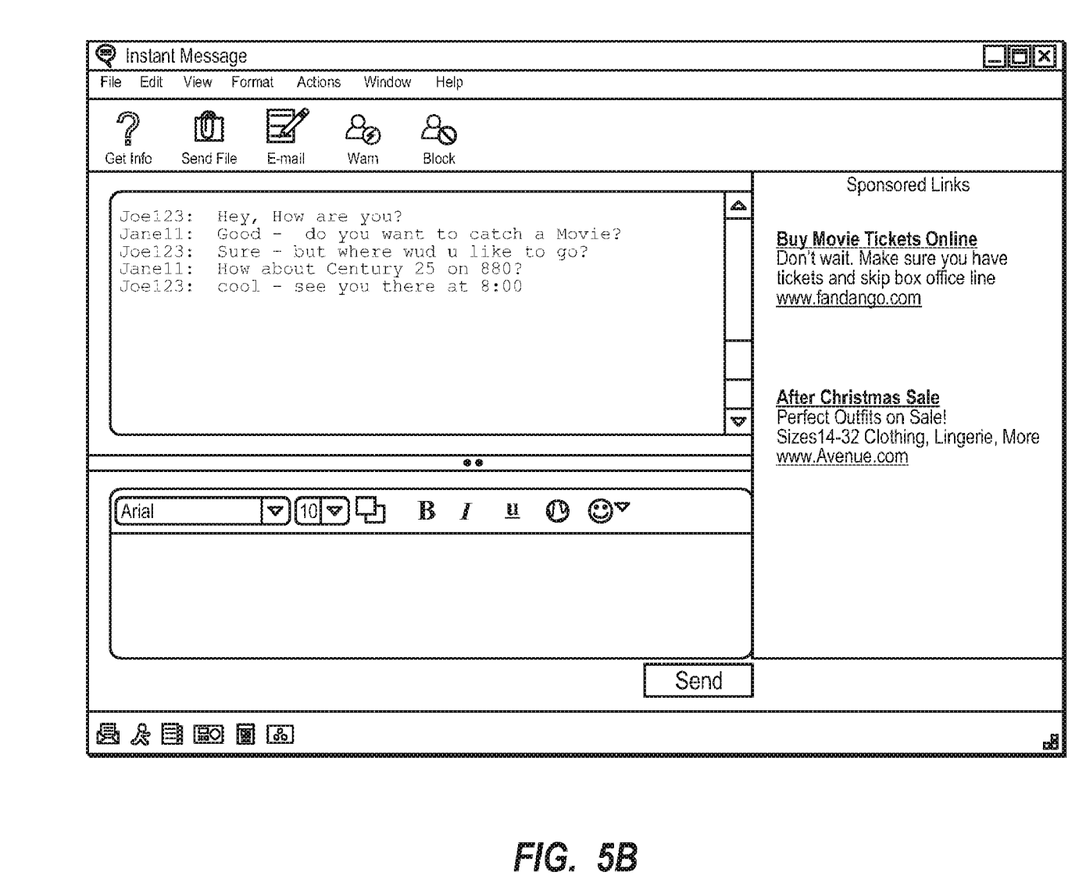
FIG. 5B illustrates an exemplary instant messaging user interface presenting various content items related to the context of a second participant in the instant messaging conversation of FIG. 5A.

At 408, server 102 sends the first content item to the first instant messaging user client system 104. For example, for time X, server 102 may determine the following for Joe's user client system 104:
  Ad Type: Sponsored Links
  Ad Sources: Google, Ingenio
  Ads Keywords: "movies in Mountain View", "golf"
  Ads presented to Joe's user client system 104:
  Buy Movie Tickets Online
  Don't wait. Make sure you have
  Tickets & skip the box office line
  www.fandango.com
  Two Free Movie Tickets
  Progressing Rewards is giving away
  movie tickets for two.
  www.ProgressingRewards.com
  Discounted Golf Clubs
  at TGW.com—The Golf Warehouse
  A Huge Selection at Great Prices
  TGW.com And, for time X, server 102 could determine the following for Jane's user client system 106:
  Ad Type: Sponsored Links
  Ad Sources: Google, Ingenio
  Ads Keywords: "movies in Sunnyvale", "Christmas sale"
  Ads presented to Jane's user client system 106:
  Buy Movie Tickets Online
  Don't wait. Make sure you have
  Tickets & skip the box office line
  www.fandango.com
  After Christmas Sale
  Perfect Outfits on Sale!
  Sizes 14-32 Clothing, Lingerie, More
  www.Avenue.com It will be appreciated that as a result of the data collected at time X, shortly thereafter, different content items can be displayed to different participants of an instant messaging session, with the content items for a particular participant being tailored to the context of that particular participant. For example, FIG. 5A illustrates an exemplary instant messaging interface that Joe might view at time X. Conversely, FIG. 5B illustrates an exemplary instant messaging interface that Jane might view at the same time X. As noted, the sponsored links provided for each of Joe and Jane are different and based on the context for that particular individual participating in the instant messaging session, rather than the same sponsored links for both participants.

At 410, server 102 further performs dynamic monitoring of the real-time context of the first instant messaging user client system 104. At 412, server 102 identifies a second content item based on a change in the real-time context of the first instant messaging client. At 414, server 102 sends the second content item to the first instant messaging user client system 104.

Thus, at time, X+10, Joe and Jane may have continued their instant messaging conversation to include discussion about specific movie options. As context monitoring module 108 of server 102 detects specific movies mentioned, the context monitoring module 108 can take these terms into account to identify content items related to these specific movies. Thus, at time X+10, the following may occur on user client systems 104, 106:
  For Joe:
  Ad Type: Video Snippet Ad Sources: http://movies.aol.com/trailer_clip_movie_preview_video
Ad presented to Joe's user client system 104: A trailer of a popular movie
For Jane:
Ad Type: Audio Snippet
Ad Sources: iTunes
Ad Keywords:"romantic"
Ad presented to Jane's user client system 106: Snippet of a Commercial As a final example, supposed at time X+20, server 102 takes into account one of Jane's past search terms for "baby sitter sunnyvale". Jane's instant messaging user client system 106 can change yet again to present content items to Jane:
Ad Type: Sponsored Links
Ad Sources: Google, Ingenio
Ads Keywords: "movies in Sunnyvale", "baby sitting, sunnyvale"
Ad presented to Jane's user client system 106:
MP3 Music Downloads
Enter Here to Start Downloading
All Your Favorite Music Now
www.lightspeedmovies.com
Free Babysitter Search
Search more than 6200 Resumes.
Your Source for Loving Babysitters.
eNannySource.com
Baby Sitting
Your children are important.
Compare local Daycare Centers.
siliconvalley.citysearch.com
San Francisco-Oakland-San Jose, Calif.

Thus, server 102 aggregates information about each user, their system capabilities, the conversation taking place and can target and rotate the content items to the users on an individualized basis. Therefore, the content items that Joe and Jane see and/or hear are different and show separately in their individual instant messaging interface.

In summary, the present invention provides that content items are presented keeping in mind the context in which they are presented (which context includes user, machine and content components). Content items are selected based on real-time evaluation of the user's current context. Content items are obtained from multiple content sources and the content item that is most relevant at the given time (X, X+10, X+20, etc.) is selected. In some embodiments, content items can be aggregated from multiple content sources. Content items can be capable of being presented in different formats based on machine capabilities and context of the user. In a group situation, content items are selected and the manner in which they are presented are tailored for each participant in a conversation.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Although the subject matter has been described in language specific to content module features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computer system, a method for providing real-time context-based content items to a user client system, the method comprising:
   dynamically monitoring a user client system to determine a real-time context of the user client system based on factors including:
      identifying one or more content keywords of a first application operating on the user client system;
      identifying one or more user demographic profile keywords of the user client system including one or more of:
         a geographic location of the user client system;
         a time at which the dynamic monitoring of the user client system is occurring;
         a date on which the dynamic monitoring of the user client system is occurring;
         an age of a user; or
         a gender of a user;
   determining a first and second system capability of the user client system, each of the first and second system capability capable of presenting content items to the user client system, the first and second system capability being monitored by sending operating calls to the user client system to receive information about the first and second system capability of the user client system, the first and second system capability being an application, video capability or audio capability; and
   determining that a user of the user client system is currently operating the first system capability such that the first system capability is undesirable for presenting content items to the user client system,
   selecting a first content item based on the real-time context of the user client system, the first content item being capable of being presented by the second system capability of the user client system;
   sending the first content item to the user client system;
   further performing dynamic monitoring of the real-time context of the user client system being performed by sending operating calls to the user client system to receive information about the first and second system capability of the user client system including identifying that the user of the user client system is no longer using the first system capability;

selecting a second content item based on a change in the real-time context of the user client system, the second content item being different than the first content item and capable of being presented by the first system capability of the user client system; and sending the second content item to the user client system.

2. The method as recited in claim 1, wherein identifying one or more content keywords of a first application operating on a user client system comprises one or more of:

crawling content presented by the first application;

detecting metadata associated with the first application;

identifying content of interest of the first application based on user interaction with at least an aspect of the first application; or identifying a lack of user interaction with at least an aspect of the first application.

3. The method as recited in claim 2, wherein identifying content of interest of the first application based on user interaction with at least an aspect of the first application includes detecting one or more of:

hovering over an aspect of a display of the first application;

clicking on a link in the content of the first application;

identifying a conversion related to content of the first application; or identifying content input by the user into the first application.

4. The method as recited in claim 1, wherein determining a first and second system capability of the user client system comprises sending an operating system call to the user client system to receive information relating to one or more of:

an operating system of the user client system;

video capabilities of the user client system;

audio capabilities of the user client system;

available processing power of the user client system;

available memory of the user client system; or properties of the first application.

5. The method as recited in claim 1, wherein dynamically monitoring a user client system to determine a real-time context of the user client system further comprises identifying one or more past search keywords of the user client system.

6. The method as recited in claim 5, wherein identifying one or more past search keywords comprises exposing one or more application programming interfaces to obtain one or more previous searches performed by the user.

7. In a distributed computer system, a method for providing real-time context-based content items to a user client system, the method comprising:

dynamically monitoring a user client system to determine a real-time context of the user client system based on factors including:

determining a first and second system capability of the user client system, each of the first and second system capability capable of presenting content items to the user client system, the first and second system capability being monitored by sending operating calls to the user client system to receive information about the first and second system capability of the user client system, and identifying one or more user demographic profile keywords of the user client system including one or more of:

a geographic location of the user client system;

a time at which the dynamic monitoring of the user client system is occurring;

a date on which the dynamic monitoring of the user client system is occurring;

an age of a user; or a gender of a user;

determining that a user of the user client system is currently operating the first system capability such that the first system capability is undesirable for presenting content items to the user client system;

selecting a first content item based on the real-time context of the user client system, the first content item capable of being presented by both of the first and second system capabilities of the user client system;

presenting the first content item on the user client system using the second system capability of the user client system, wherein the second system capability is selected for presenting the first content item on the user client system due to the undesirability of the first system capability;

further performing dynamic monitoring of the real-time context of the user client system to detect a change in the real-time context of the user client system being performed by sending operating calls to the user client system to receive information about the first and second system capability of the user client system including identifying that the user of the user client system is no longer using the first system capability; and presenting the first content item on the user client system using the second system capability of the user client system.

8. The method as recited in claim 7, wherein dynamically monitoring a user client system to determine a real-time context of the user client system further comprises one or more of:

identifying one or more content keywords of a first application operating on the user client system;

identifying user interaction with at least an aspect of the user client system;

identifying a lack of user interaction with at least an aspect of the user client system; or identifying one or more past search keywords of the user client system.

9. The method as recited in claim 7, wherein determining one or more system capabilities of the user client system comprises sending an operating system call to the user client system to receiving information relating to one or more of:

an embedded HTML application running on the user client system;

an operating system of the user client system;

video capabilities of one or more applications running on the user client system;

audio capabilities of one or more applications running the user client system;

available processing power of the user client system; or available memory of the user client system.

10. The method as recited in claim 7, wherein dynamically monitoring a user client system to determine a real-time context of the user client system further comprises identifying one or more content keywords of a first application operating on a user client system comprising one or more of:

crawling content presented by the first application on the user client system;

detecting metadata associated with the first application;

identifying user interaction with at least an aspect of the first application; or identifying a lack of user interaction with at least an aspect of the first application.

11. The method as recited in claim 10, wherein identifying user interaction with at least an aspect of the user client system includes one or more of:
- hovering over an aspect of a display of the user client system;
- clicking on a link in the content of the user client system;
- identifying a conversion related to content of the user client system; or
- identifying content input by the user into the user client system.

12. In an instant messaging system comprising an instant messaging client and an instant messaging server, a method for providing real-time context-based content items to the instant messaging client, the method comprising:
- identifying an instant messaging session between a first instant messaging client and a second instant messaging client;
- dynamically monitoring the instant messaging session to determine a real-time context of each of the first instant messaging client and the second instant messaging client including based on factors including:
  - identifying one or more content keywords of the instant messaging session;
  - identifying one or more user demographic profile keywords of each instant messaging client including one or more of:
    - a geographic location of each instant messaging client,
    - a time at which the dynamic monitoring of the instant messaging session is occurring,
    - a date on which the dynamic monitoring of the instant messaging session is occurring,
    - an age of a user of each instant messaging client, or
    - a gender of a user of each instant messaging client;
  - determining one or more system capabilities of each instant messaging client, the system capability being monitored by sending operating calls to each instant messaging client to receive information about the system capabilities of each instant messaging client;
- identifying a first content item based on the real-time context of the first instant messaging client;
- sending the first content item to the first instant messaging client;
- identifying a second content item based on the real-time content of the second instant messaging client, wherein the second content item is different than the first content item due to a difference in the real-time context of the first instant messaging client and the second instant messaging client;
- sending the second content item to the second instant messaging client;
- further performing dynamic monitoring of the real-time context of each of the first instant messaging client and the second instant messaging client;
- identifying a third content item based on a change in the real-time context of the first instant messaging client;
- sending the third content item to the first instant messaging client;
- identifying a fourth content item based on a change in the real-time context of the second instant messaging client, wherein the fourth content item is different than the third content item due to a difference in the change of the real-time context of the first instant messaging client and the second instant messaging client; and
- sending the fourth content item to the second instant messaging client.

13. The method as recited in claim 12, wherein dynamically monitoring a first instant messaging client to determine a real-time context of the first instant messaging client further comprises one or more of:
- identifying a user interaction with at least an aspect of the first instant messaging client;
- identifying a lack of user interaction with at least an aspect of the first instant messaging client; or
- identifying one or more past search keywords of the first instant messaging client.

14. The method as recited in claim 12, wherein determining one or more system capabilities of each instant messaging client comprises sending an operating system call to each instant messaging client to receive information relating to one or more of:
- an operating system of the first instant messaging client;
- video capabilities of the first instant messaging client;
- audio capabilities of the first instant messaging client;
- available processing power of the first instant messaging client; or
- available memory of the first instant messaging client.

15. The method as recited in claim 12, wherein identifying one or more content keywords of the instant messaging session comprises one or more of:
- crawling content presented by the instant messaging session on the first instant messaging client;
- detecting metadata associated with the instant messaging session;
- identifying user interaction with at least an aspect of the first instant messaging client; or
- identifying a lack of user interaction with at least an aspect of the first instant messaging client.

16. The method as recited in claim 15, wherein identifying user interaction with at least an aspect of the instant messaging session includes one or more of:
- hovering over an aspect of a display of the first instant messaging client;
- clicking on a link in the content of the first instant messaging client;
- identifying a conversion related to content of the first instant messaging client; or
- identifying content input by the user into the first instant messaging client.

* * * * *